(12) United States Patent
Seshagiri et al.

(10) Patent No.: US 11,243,762 B1
(45) Date of Patent: Feb. 8, 2022

(54) VERSION CONTROLLER BULLETIN

(71) Applicant: International Business Machines Corporation, Armonk, NY (US)

(72) Inventors: Sudhakar T. Seshagiri, Bangalore (IN); Shwetha Gopalakrishna, Bangalore (IN); Prasanna Alur Mathada, Bangalore (IN); Prashant Nathusao Kapse, Pimple Gurav (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/034,115

(22) Filed: Sep. 28, 2020

(51) Int. Cl.
| | |
|---|---|
| *G06F 17/00* | (2019.01) |
| *G06F 16/11* | (2019.01) |
| *G06F 11/14* | (2006.01) |
| *G06F 11/36* | (2006.01) |
| *G06F 8/71* | (2018.01) |
| *G06F 9/44* | (2018.01) |
| *G06F 8/73* | (2018.01) |
| *G06F 16/908* | (2019.01) |
| *G06F 16/906* | (2019.01) |

(52) U.S. Cl.
CPC ............ *G06F 8/71* (2013.01); *G06F 8/73* (2013.01); *G06F 16/128* (2019.01); *G06F 16/906* (2019.01); *G06F 16/908* (2019.01)

(58) Field of Classification Search
CPC ..... G06F 8/33; G06F 8/71; G06F 8/73; G06F 8/65; G06F 11/3438; G06F 11/3664; G06F 16/906; G06F 16/908; G06F 16/128; G06F 16/248; G06F 16/26; G06F 15/8007; G06F 15/8076; G06F 16/221; G06F 16/8076; G06F 16/0689; G06F 3/065; G06F 3/0689; H04L 67/02; H04L 67/06; H04L 67/2838
See application file for complete search history.

(56) References Cited

U.S. PATENT DOCUMENTS

| | | |
|---|---|---|
| 8,826,222 B2 | 9/2014 | Bak |
| 9,158,658 B2 | 10/2015 | Bigwood |

(Continued)

OTHER PUBLICATIONS

Majumdar et al., Source code management using version control system, 4 pages (Year: 2017).*

(Continued)

*Primary Examiner* — Thuy Dao

(74) *Attorney, Agent, or Firm* — William H. Hartwell

(57) ABSTRACT

A tool for providing a version controller bulletin. The tool retrieves metadata from a plurality of version controller repositories in a development environment. The tool creates one or more snapshots for the metadata over a pre-determined period of time, wherein the pre-determined period of time includes a start time and an end time. The tool determines a metadata difference between non-code related issue clusters of the one or more snapshots. The tool determines a confidence to conflict value and a line of code range for code related issue clusters of the one or more snapshots, wherein the confidence to conflict value represents a probability of a merge conflict. The tool provides respective heat maps for code related issue clusters and non-code related issue clusters. The tool outputs to a version controller bulletin, the metadata difference, the confidence to conflict value, respective heat maps, and the line of code range.

20 Claims, 5 Drawing Sheets

(56) References Cited

U.S. PATENT DOCUMENTS

| | | |
|---|---|---|
| 9,430,229 B1 | 8/2016 | Van Zijst |
| 9,632,771 B2 | 4/2017 | Toub |
| 9,652,366 B2 | 5/2017 | Sivanesan |
| 11,119,759 B2 * | 9/2021 | Samudrala ............ G06N 20/00 |
| 2013/0036400 A1 | 2/2013 | Bak |
| 2015/0032699 A1 * | 1/2015 | Fujita ................... G06F 3/0689 |
| | | 707/649 |

OTHER PUBLICATIONS

Chong et al., Composite-based conflict resolution in merging versions of UML models, 6 pages (Year: 2016).*

"Git merge conflicts", Atlassian Git Tutorial, retrieved from the Internet on Jul. 21, 2020, 4 pages, <https://www.atlassian.com/git/tutorials/using-branches/merge-conflicts>.

"Learn Git and GitHub without any code!", retrieved from the Internet on Jul. 21, 2020, 2 pages, <https://github.ibm.com/>.

"Tutorial: Quickstart", TextBlob 0.16.0 documentation, retrieved from the Internet on Jul. 21, 2020, 7 pages, <https://textblob.readthedocs.io/en/dev/quickstart.html#sentiment-analysis>.

Asri et al., "An empirical study of sentiments in code reviews", Information and Software Technology 114 (2019) pp. 37-54, Available online Jun. 18, 2019, https://doi.org/10.1016/j.infsof.2019.06.005.

Authors et al.: Disclosed Anonymously, "System and Method for realtime conflict detection of version controlled artifacts", An IP.com Prior Art Database Technical Disclosure, IP.com No. IPCOM000244472D, IP.com Electronic Publication Date: Dec. 15, 2015, 4 pages.

Kjanko, "Python Fingerprint Recognition", GitHub, retrieved from the Internet on Jul. 21, 2020, 3 pages, <https://github.com/kjanko/python-fingerprint-recognition>.

* cited by examiner

VERSION CONTROLLER BULLETIN

BACKGROUND OF THE INVENTION

The present invention relates generally to software development, and more particularly to distributed version-control systems.

A distributed version-control system tracks changes in source code during software development. The distributed version-control system is designed for coordinating work in multi-programmer environments, and can be utilized to track changes in any set of files. The distributed version-control system is a form of version control where the complete codebase, including a full history for the codebase, is mirrored on each computing device in the multi-programmer environment. Distributed version-control is a peer-to-peer approach to version control, leveraging synchronized repositories for peer-to-peer transfer of patches, in which each programmer in a multi-programmer environment has a working copy and a full change history of the files.

SUMMARY

Aspects of an embodiment of the present invention disclose a method, a computer program product, and a computer system for a version controller bulletin that provides an overview of source code changes in a multi-programmer environment. The method includes retrieving, by one or more computer processors, metadata from a plurality of version controller repositories in a development environment. The method includes creating, by the one or more computer processors, one or more snapshots for the metadata over a pre-determined period of time, wherein the pre-determined period of time includes a start time and an end time, and wherein the one or more snapshots includes the metadata stored in the version controller repository between the start time and the end time. The method includes determining, by the one or more computer processors, a metadata difference between non-code related issue clusters of the one or more snapshots. The method includes determining, by the one or more computer processors, a confidence to conflict value and a line of code range for code related issue clusters of the one or more snapshots, wherein the confidence to conflict value represents a probability of a merge conflict. The method includes providing, by the one or more computer processors, respective heat maps for the code related issue clusters and the non-code related issue clusters. The method includes outputting, by the one or more computer processors, to a version controller bulletin, the metadata difference, the confidence to conflict value, the respective heat maps, and the line of code range.

DETAILED DESCRIPTION

Embodiments of the present invention recognize that version controllers spawn updates to various email notification systems, dashboards, and charts, etc. Embodiments of the present invention further recognize that for an individual or a team working on multiple projects or repositories, gathering an overview of changes that have been made may involve searching multiple locations for relevant information. Embodiments of the present invention further recognize a need for a method that can be applied to any version controller to provide a bulletin and news feed in a singular location that displays an overview of all changes that have occurred across multiple projects and repositories during a set period of time.

Embodiments of the present invention provide the capability to create one or more snapshots to provide an overview of input information for a version controller. Embodiments of the present invention further provide the capability to determine a metadata difference between the one or more snapshots during a period of time to provide updates on changes made to a bulletin and news feed interface. Embodiments of the present invention further provide the capability to determine a probability of a merge conflict and provides a line of change range and an associated color code (e.g., heat map) indicating an impact of a source code change.

Implementation of such embodiments may take a variety of forms, and exemplary implementation details are discussed subsequently with reference to the Figures.

Figure 1:
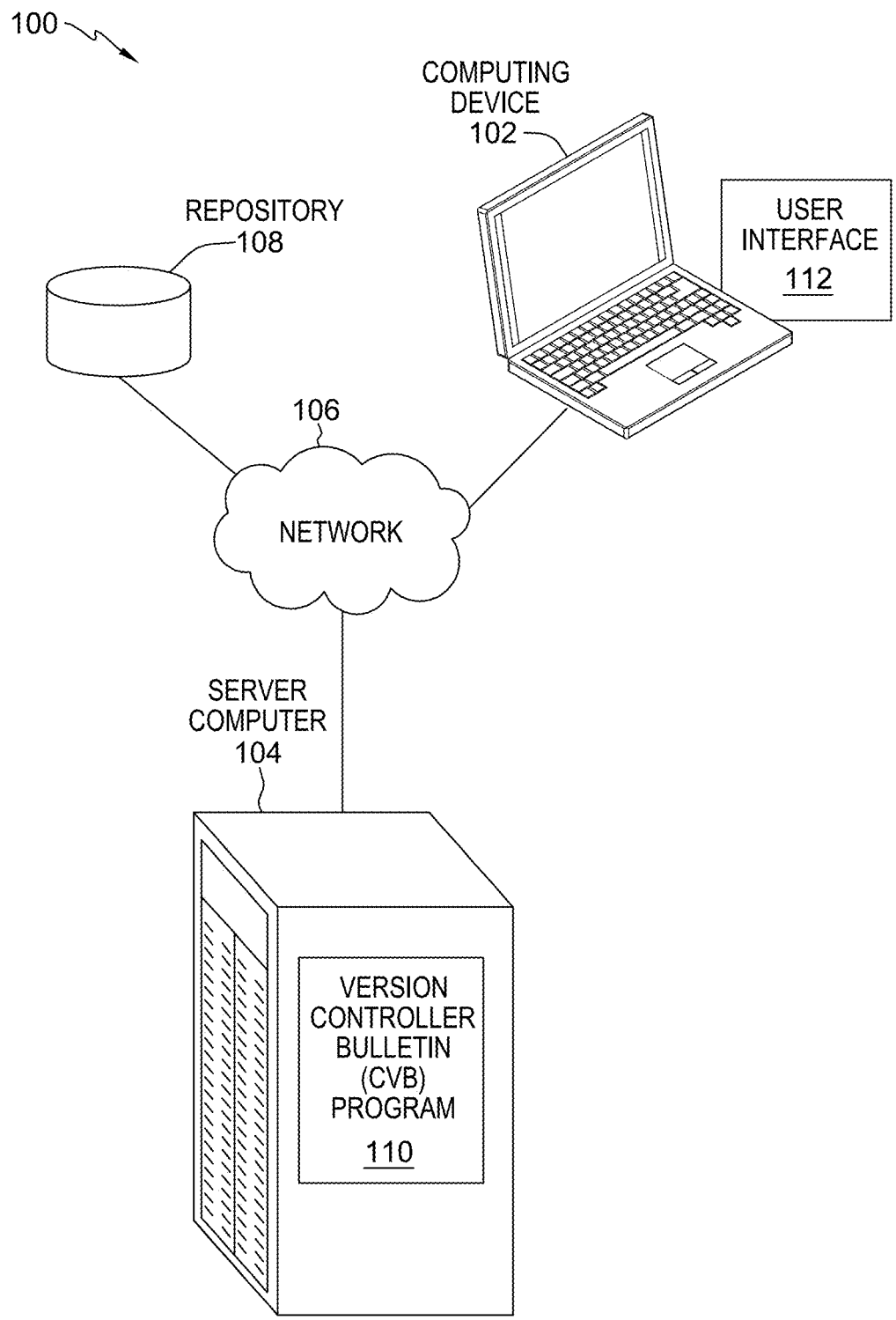
FIG. 1 is a functional block diagram illustrating a data processing environment suitable for operation of a VCB program for providing a version controller overview during a pre-determined period of time, in accordance with an embodiment of the present invention.

Referring now to various embodiments of the invention in more detail, FIG. 1 is a functional block diagram of a distributed data processing environment, generally designated 100, suitable for operation of a version controller bulletin program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 and server computer 104, and repository 108, all interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between computing device 102, server computer 104, and repository 108, as well as other computing devices (not shown) within distributed data processing environment 100. FIG. 1 is intended as an example and not as an architectural limitation for the different embodiments.

In one embodiment, computing device 102 may be a laptop computer, tablet computer, smartphone, smartwatch, or any programmable electronic device capable of communicating with various components and devices within distributed data processing environment 100, via network 106. In general, computing device 102 may represent any programmable electronic device or combination of programmable electronic devices capable of executing machine readable program instructions and communicating with other computing devices (not shown) within distributed data processing environment 100 via a network, such as network 106. More specifically, computing device 102 represents any device capable of sending and receiving signals, monitoring data, and analyzing feedback. In another embodiment, computing device 102 may represent a computing device in a multi-programmer environment for performing version control on source code files. In yet another embodiment, computing device 102 is a computer device capable of connecting to, or being paired with, a repository, such as repository 108, via a wireless or proximity type connection. In one embodiment, computing device 102 is capable of communicating with server computer 104, version controller bulletin (VCB) program 110, and repository 108. In one embodiment, computing device 102 may include application software that supports functionality provided by VCB program 110, or acts as an agent application for VCB program 110. In one embodiment, computing device 102 includes user interface 112.

In one embodiment, user interface 112 provides an interface between a user of computing device 102, VCB program 110, and server computer 104. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control a program. In another embodiment, user interface 112 may also be mobile application software that provides an interface between a user of computing device 102, repository 108, VCB program 110, and server computer 104. Mobile application software, or an "app," is a computer program that runs on smartphones, tablet computers, smartwatches and any other mobile devices.

In one embodiment, server computer 104 can be a stand-alone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In an embodiment, server computer 104 represents a computing system utilizing clustered computers and components (e.g., database server computers, application server computers, etc.) that act as a single pool of seamless resources when accessed within distributed data processing environment 100. Server computer 104 includes VCB program 110 communicatively coupled to server computer 104, and facilitates communication between VCB program 110, computing device 102, and repository 108. Server computer 104 may include internal and external hardware components, as depicted and described in further detail with respect to FIG. 3.

In one embodiment, VCB program 110 operates on a central server, such as server computer 104 and may be utilized by one or more computing devices, such as computing device 102, and repository 108, via network 106. In another embodiment, VCB program 110 may be a program downloaded from the central server or a third-party provider (not shown), and executed on a computing device, such as computing device 102, for providing a bulletin board, such as repository 108. In another embodiment, VCB program 110 may be a program installed on one or more computing devices, such as computing device 102, to be executed by one or more embedded computer processors. In yet another embodiment, VCB program 110 may be utilized as a software service provided by a third-party cloud service provider (not shown). In yet another embodiment, VCB program 110 may include one or more components, such as add-ons, plug-ins, and agent programs, etc., installed on one or more computing devices, such as computing device 102, for creating a virtual bulletin board and news feed highlighting any changes to source master files.

In one embodiment, VCB program 110 is a program for creating a version controller bulletin board that provides an overview of source code projects and changes to source controller files in a multi-programmer environment. In one embodiment, VCB program 110 provides the capability to create a snapshot of version controller inputs during a pre-determined period of time. In one embodiment, VCB program 110 provides the capability to determine variations between two or more snapshots, and redirect the outputted determined variations between the two or more snapshots to a virtual bulletin board and news feed. In one embodiment, VCB program 110 provides the capability to precisely update a virtual bulletin board and news feed with version control updates made during a pre-determined period of time where there is no chance of merge conflicts (e.g., approval issues). In another embodiment, VCB program 110 provides the capability to determine a probability of a merge conflict in a current source controller file that a programmer is working on, provide a line of code (LOC) range for a portion of source code determined to have a high probability of merge conflict between two or more snapshots during a pre-determined period of time, and output the LOC range and probability for merge conflict in total code to a virtual bulletin board and news feed available to each programmer in a multi-programmer collaborative environment. In one embodiment, VCB program 110 provides the capability to filter version controller inputs into one or more clusters, where the one or more clusters include a code data cluster and a non-code data cluster.

In one embodiment, repository 108 is a source code repository interconnected with a server, such as server computer 104, and a computing device, such as computing device 102, via a network, such as network 106. In another embodiment, repository 108 is a source code repository capable of wirelessly pairing with a server computer, such as server computer 104, a computing device, such as computing device 102, and capable of communicating with a program on a server, such as VCB program 110 on server computer 104. In one embodiment, repository 108 is a data structure that stores metadata for a set of files or directory structure. In some embodiments, VCB program 110 accesses, via network 106, repository 108 to retrieve metadata for a set of files. In some embodiments, repository 108 is utilized in a distributed version-control system, where all metadata stored with repository 108 can be duplicated on each computing device in a multi-programmer collaborative environment. In one embodiment, repository 108 includes metadata that includes, without limitation, source code files, a historical record of changes in a repository, such as repository 108, etc.

In some embodiments, repository 108 can be a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with server computer 104 and computing device 102, via network 106. In other embodiments, repository 108 can represent a virtual instance operating on a computing system utilizing clustered computers and components (e.g., database server computer, application server computers, etc.) that act as a single pool of seamless resources when accessed within data processing environment 100.

Figure 2:
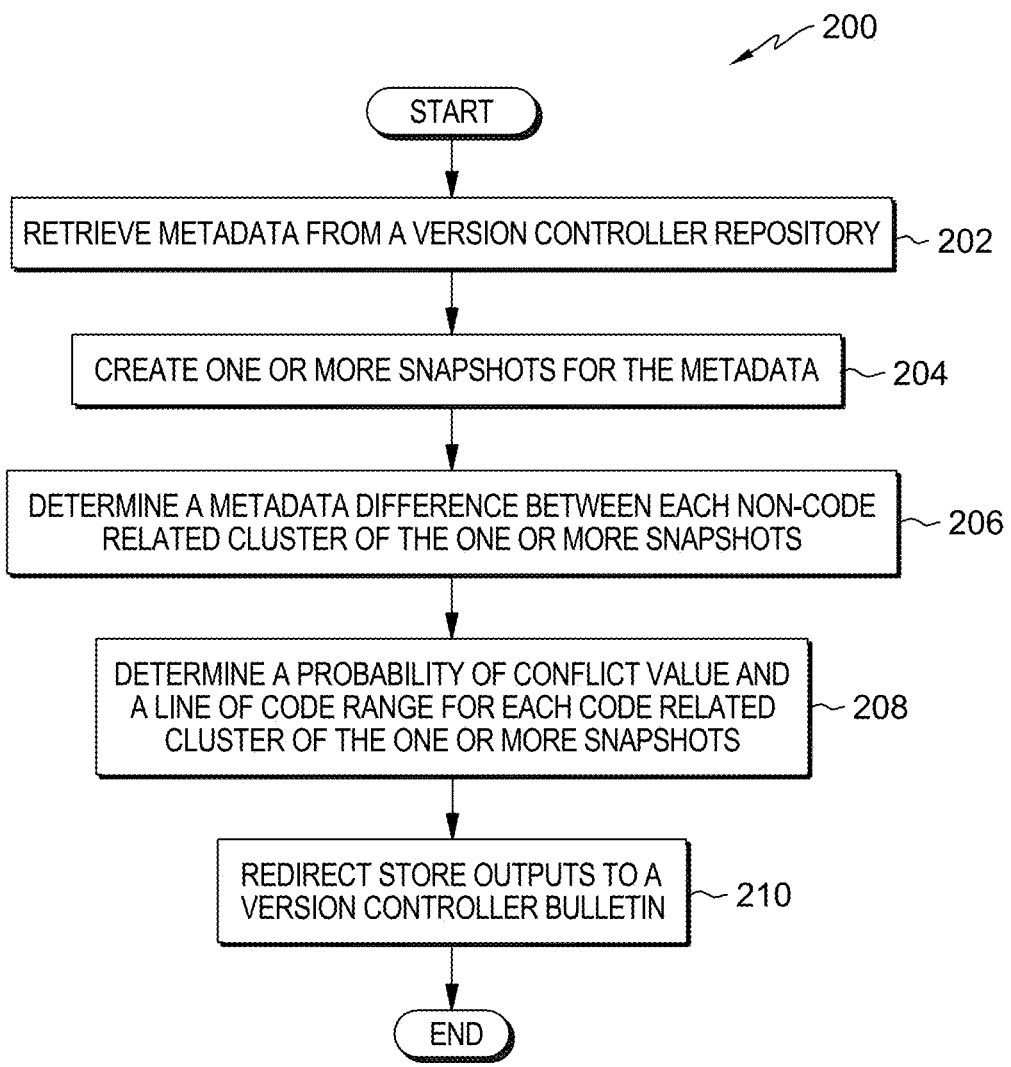
FIG. 2 is a flowchart depicting operational steps of a VCB program for providing a version controller overview during a pre-determined period of time, in accordance with an embodiment of the present invention.

FIG. 2 depicts a flowchart of operational steps of a version controller bulletin (VCB) program, such as VCB program 110 of FIG. 1, generally designated 200, for providing a version controller overview during a pre-determined period of time, in accordance with an embodiment of the present invention.

VCB program 110 retrieve metadata from a version controller repository (202). In one embodiment, VCB program 110 retrieves metadata from a version controller repository, such as repository 108, where the metadata includes version controller inputs including, but not limited to, labels, assignees, backlogs, versions, etc. In some embodiments, the data is metadata related to source code files and source code projects stored within the version controller repository, such as repository 108. In another embodiment, VCB program 110 retrieves metadata from a plurality of version controller repositories in a development environment, including a plurality of projects and a plurality of versions of the projects. In one embodiment, VCB program 110 can configure each of a plurality of projects, organizations, and repositories, etc., into a singular project, assign the singular project to a given programmer, and retrieve metadata from the singular project.

VCB program 110 creates one or more snapshots for the metadata (204). In one embodiment, VCB program 110 creates one or more snapshots for the metadata over a pre-defined period of time, where the pre-defined period of time can be a user defined period of time that includes a start time and an end time, and the one or more snapshots includes the metadata stored in the version controller repository, such as repository 108, between the start time and the end time. For example, a user defined period of time may be 9 AM to 5 PM on a given day of the week, or Monday to Friday of a given week. In another embodiment, the pre-defined period of time may be a period of time since a last previous snapshot was created and stored in the version controller repository, such as repository 108. For example, the pre-defined period of time may be 13 days where a last previous snapshot was created 13 days prior to creating a current snapshot, and no other pre-defined period of time is designated. In one embodiment, VCB program 110 creates one or more snapshots by clustering the metadata retrieved from the version controller repository, such as repository 108, into one or more clusters (i.e., groups) based, at least in part, on whether the metadata is code related input or non-code related input. For example, each of the one or more snapshots will include one or more clusters of retrieved metadata, such as a code related issue cluster and a non-code related issue cluster. In one embodiment, for example, VCB program 110 can utilize a global regular expression print (Grep) command to search the metadata for all issues associated with a given programmer associated with the version controller repository, and for any issues associated with a merge request, flag the issues associated with the merge request as code related data and assign those issues to the code related issue cluster. In one embodiment, for all other issues associated with the given programmer associated with the version controller repository, assign those issues to the non-code related issue cluster. In another embodiment, in addition to the one or more clusters, each of the one or more snapshots will include any changes made in the version controller repository at a file level during the pre-defined period of time.

VCB program 110 determines a metadata difference between each non-code related issue cluster of the one or more snapshots (206). In one embodiment, VCB program 110 determines a metadata difference between each non-code related issue cluster of the one or more snapshots utilizing a run time query between the non-code related issue clusters of the one or more snapshots. In one embodiment, VCB program 110 stores the metadata differences of the run time query for output to a version controller bulletin. Steps for determining the metadata difference between each non-code related issue cluster of the one or more snapshots are discussed in further detail below in FIG. 3.

VCB program 110 determines a probability of conflict value and a line of code range for each code related issue cluster of the one or more snapshots (208). In one embodiment, VCB program 110 determines a probability of conflict value and a line of code range for each code related issue cluster of the one or more snapshots by computing a probability of conflict in total code for a portion code of interest under merge conflict and a line of code range between the one or more snapshots. In one embodiment, VCB program 110 stores the determined probability of conflict value and a line of code range for each code related issue cluster of the one or more snapshots for output to a version controller bulletin. In one embodiment, VCB program 110 assigns a color code (e.g., heat map) to each code issue from each code related issue cluster indicating a level of impact for the code change. Steps for determining a probability of conflict value and a line of code range for each code related issue cluster of the one or more snapshots are discussed in further detail below in FIG. 4.

VCB program 110 redirects stored outputs to a version controller bulletin (210). In one embodiment, VCB program 110 redirects stored outputs for each code related issue cluster and non-code related issue cluster of the one or more snapshots to a version controller bulletin for consumption by each programmer in the multi-programmer collaborative environment.

Figure 3:
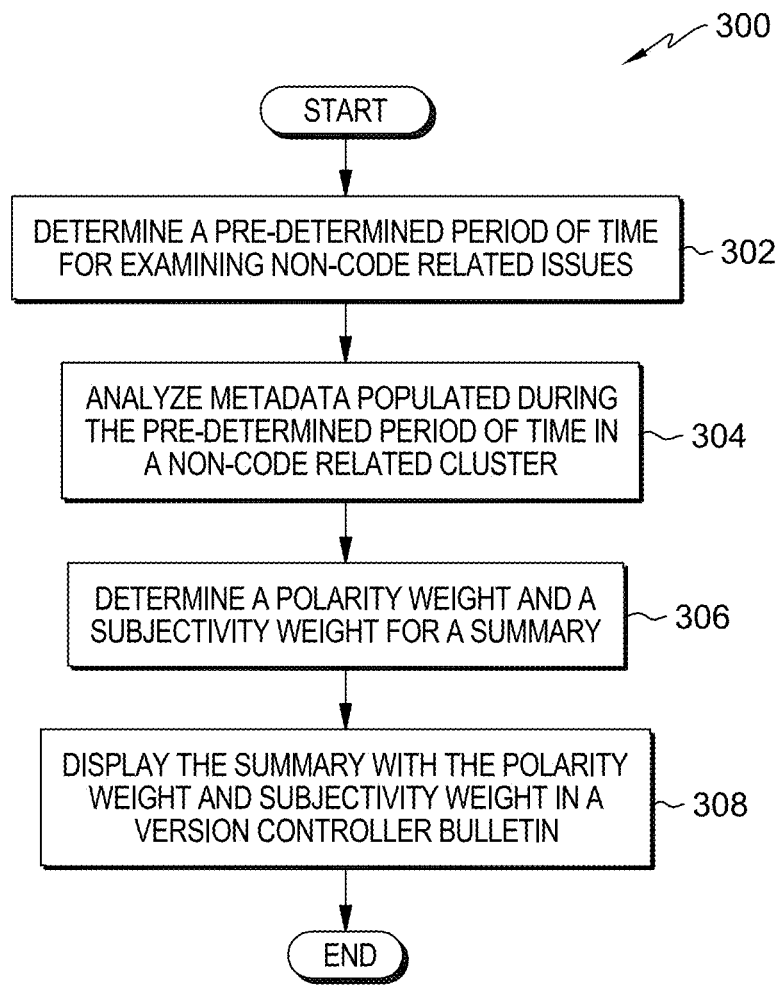
FIG. 3 is a flowchart depicting operational steps of a VCB program for providing a version controller overview of non-code related issues, in accordance with an embodiment of the present invention.

FIG. 3 depicts a flowchart of operational steps of a version controller bulletin (VCB) program, such as VCB program 110 of FIG. 1, generally designated 300, for providing a version controller overview of non-code related issues, in accordance with an embodiment of the present invention.

VCB program 110 determines a pre-determined period of time for examining non-code related issues (302). In one embodiment, VCB program 110 determines a pre-determined period of time for examining non-code related issues by receiving user input indicating a start time and an end time. For example, where a programmer enters a start time of Monday at 8 AM and an end time of Tuesday at 8 AM on a user interface, such as user interface 112, VCB program 110 determines the pre-determined period of time for examining non-code related issues to be for a 24 hour period between Monday at 8 AM and Tuesday at 8 AM. In another embodiment, VCB program 110 determines a per-determined period of time for examining non-code related issues by referencing a timestamp of when a last previous snapshot was created. For example, where no user input is entered in a user interface, VCB program 110 searches for a timestamp of when a last previous snapshot was created, and further determines the pre-determined period of time for examining non-code related issues to be between the last previous snapshot and a current timestamp for creating a snapshot for non-code related issues.

VCB program 110 analyzes metadata populated during the pre-determined period of time in a non-code related issue cluster (304). In one embodiment, VCB program 110 analyzes data populated in a version controller repository during the pre-determined period of time in a non-code related issue cluster by utilizing a run time query and natural language processing techniques to determine a metadata difference between the non-code related issue cluster of one or more snapshots. In one embodiment, VCB program 110 utilizes a global regular expression print (Grep) command to search the metadata for one or more snapshots updated in the version controller repository, such as repository 108, from the run time query. In one embodiment, VCB program 110 may utilize a simple application programing interface (API) for parsing through common natural language processing tasks, such as part-of-speech tagging, noun phrase extraction, sentiment analysis, translation, and classification, etc. In one embodiment, VCB program 110 generates a summary of the analysis of the metadata captured in the one or more snapshots.

VCB program 110 determines a polarity weight and a subjectivity weight for a summary (306). In one embodiment, VCB program 110 determines a polarity weight and subjectivity weight for the summary by applying sentiment analysis to the summary and assigning an emoji to each update identified in the one or more snapshots during subsequent analysis. For example, VCB program 110 may use a text blob type of sentiment analysis to determine a polarity weight, which may be a float value in a range (e.g., −1 to 1) where a value at a low end of the range indicates a negative statement, and a value at a high end of the range indicates a positive statement. Further, VCB program 110 may determine a subjectivity weight, which may be a float value in a range (e.g., 0 to 1) where a value at a low end of the range indicates a factual statement, and a value at the high end of the range indicates a subjective statement. In one embodiment, VCB program 110 assigns a variety of emojis to positive statements, negative statements, factual statements, and subjective statements to convey to a programmer accessing a version control bulletin the nature of the metadata in the summary.

VCB program 110 displays the summary with the polarity weight and subjectivity weight in a version controller bulletin (308). In one embodiment, VCB program 110 displays the summary with the polarity weight, subjectivity weight, and assigned emojis in a version controller bulletin in a user interface, such as user interface 112. In one embodiment, VCB program 110 displays the generated summary with a current time stamp indicating when the last update to the one or more snapshots was performed. In one embodiment, VCB program 110 arranges metadata from the summary in the version controller bulletin based, at least in part, on the polarity weight, the subjectivity weight, a severity of an issue, an impending deadline, and a user defined priority for specific information.

Figure 4:
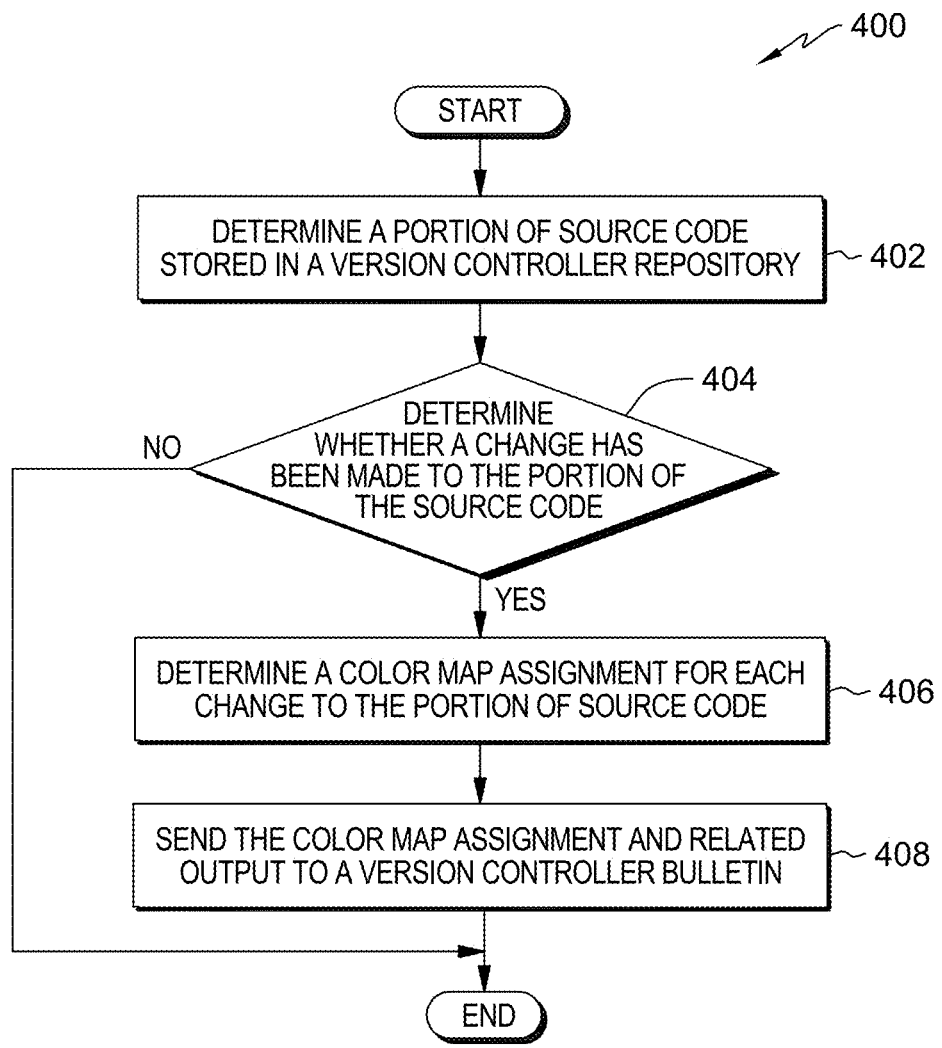
FIG. 4 is a flowchart depicting operational steps of a VCB program for providing a version controller overview of code related issues, in accordance with an embodiment of the present invention.

FIG. 4 depicts a flowchart of operational steps of a version controller bulletin (VCB) program, such as VCB program 110 of FIG. 1, generally designated 400, for providing a version controller overview of code related issues, in accordance with an embodiment of the present invention.

VCB program 110 determines a portion of source code stored in a version controller repository (402). In one embodiment, VCB program 110 determines a portion of source code stored in a version controller repository by receiving user input identifying a section of source code of interest to a programmer. In one embodiment, VCB program 110 identifies an initial programmer working on the section of source code of interest using a unique identifier, and correlates the initial programmer to the section of course code of interest using the unique identifier.

VCB program 110 determines whether a change has been made to the portion of source code (decision block 404). In one embodiment, VCB program 110 determines whether a change has been made to the portion of source code of interest by determining whether an additional programmer has made any changes to the portion of source code of interest. Where an additional programmer has made a change to the portion of source code of interest outside of any changes made by the initial programmer, VCB program 110 determines that a change has been made to the portion of source code. Where an additional programmer has not made any changes to the portion of source code of interest outside of any changes made by the initial programmer, VCB program 110 determines that a change has not been made to the portion of source code.

Responsive to a determination that an additional programmer has not made any changes to the portion of source code of interest (NO branch, 404), VCB program determines that the source code is unchanged, and no further action taken (END).

Responsive to a determination that an additional programmer has made a change to the portion of source code of interest (YES branch, 404), VCB program 110 determines a color map assignment for each change to the portion of source code (406). In one embodiment, VCB program 110 determines a color map (e.g., heat map) assignment for each change to the portion of source code based, at least in part, on a type of source code change, a number of changes made, and associated change parameters. In one embodiment, VCB program 110 determines the color map (e.g., heat map) assignment for each change to the portion of source code based, at least in part, by a level of impact the type of change has on the portion of source code. In one embodiment, VCB program 110 utilizes a colored hex code (e.g., red and blue) for creating and assigning the color map (e.g., heat map) to the portion of source code based, at least in part, on a type of change, a number of changes made, and a level of impact the type of change has on the portion of source code. For example, where a change to the portion of source code shares the same date master branch (base source code), indicating the source code has been cloned from the same version with little to no impact on the source code, VCB program 110 may assign a shade blue (e.g., light for minor impact, dark for no impact) to the change identified in the source code issue. In another example, where multiple changes to the portion of source code were made, including a unit test case failing, an independent module has a test case fail from an additional programmer, one or more dependent merge code requests have regression issues, and there already exist merge code requests for the portion of source code, etc., VCB program 110 may assign a shade of red (e.g., light for moderate impact, dark for most impact) to the change identified in the source code issue. In one embodiment, VCB program 110 increments a confident to conflict counter for each assignment of a shade of red, and increments a total iteration count. In some embodiments, VCB program 110 may perform natural language processing and compute a polarity weight and subjectivity weight on comments on merge code requests and code issues, and where the polarity weight is negative, assign a shade of red to the change identified in the source code. In some embodiments, VCB program 110 determines a line of code range for the portion of the source code containing the code issues and identified changes that have the most impact as indicated by the assigned color map (e.g., assigned heat map having shades of red). In some embodiments, VCB program 110 determines a probability of confidence to conflict in total code value by determining a total iteration count divided by a value of a confident to conflict counter for each assignment of a shade of red.

VCB program 110 sends the color map assignment and related output to a version controller bulletin (408). In one embodiment, sends the color map (e.g., heat map) assignment and related output to a version controller bulletin, where the related output includes the probability for conflict in total code value, the line of code range for the portion of the source code containing code issues, a polarity weight and a subjectivity weight for any related comments for the source code issues, and one or more associated emojis.

Figure 5:
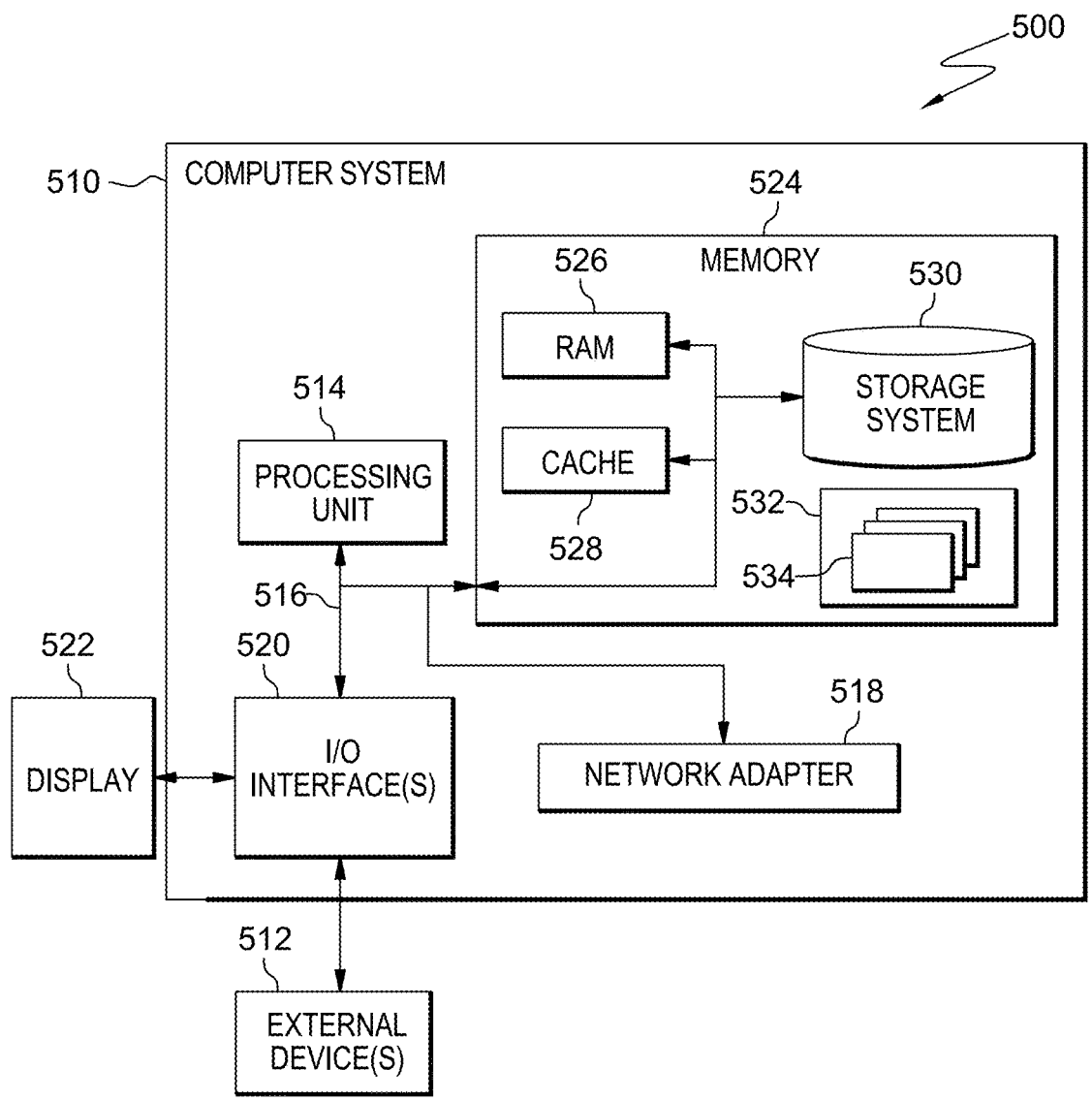
FIG. 5 is a block diagram depicting components of a data processing system (e.g., server computer of FIG. 1), in accordance with an embodiment of the present invention.

FIG. 5 depicts a block diagram of components of data processing system, such as server computer 104 of FIG. 1, generally designated 500, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, server computer 104 in distributed data processing environment 100 is shown in the form of a general-purpose computing device, such as computer system 510. The components of computer system 510 may include, but are not limited to, one or more processors or processing unit(s) 514, memory 524 and bus 516 that couples various system components including memory 524 to processing unit(s) 514.

Bus 516 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 510 typically includes a variety of computer system readable media. Such media may be any available media that is accessible by computer system 410 and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example and not limitation, as well as an operating system, one or more application programs, other program modules and program data. Each of the operating systems, one or more application programs, other program modules and program data or some combination thereof, may include an implementation of a networking environment. Program modules 534 generally carry out the functions and/or methodologies of embodiments of the invention as described herein. Computer system 510 may also communicate with one or more external device(s) 512, such as a keyboard, a pointing device, a display 522, etc. or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks, such as a local area network (LAN), a general wide area network (WAN) and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives and data archival storage systems may be used in conjunction with computer system 510.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method comprising:
    creating, by one or more computer processors, one or more snapshots for metadata stored in a plurality of version controller repositories, wherein the one or more snapshots correspond to a pre-determined period of time between a start time and an end time;
    determining, by the one or more computer processors, a metadata difference between non-code related issue clusters of the one or more snapshots;
    determining, by the one or more computer processors, a probability of a merge conflict for code related issue clusters of the one or more snapshots; and outputting, by the one or more computer processors, to a version controller bulletin, the metadata difference and the probability of a merge conflict.

2. The method of claim 1, further comprising:
determining, by the one or more computer processors, the pre-determined period of time, wherein determining the pre-determined period of time includes receiving user input indicating the start time and the end time.

3. The method of claim 1, wherein the metadata difference between the non-code related issue clusters is determined utilizing a run time query and natural language processing techniques.

4. The method of claim 1, further comprising:
generating, by the one or more computer processors, a summary of an analysis of the metadata included in the one or more snapshots;
determining, by the one or more computer processors, a polarity weight and subjectivity weight for the generated summary; and
outputting, by the one or more computer processors, the generated summary, the polarity weight, and the subjectivity weight to the version controller bulletin for display.

5. The method of claim 1, further comprising:
determining, by the one or more computer processors, a portion of source code stored in a version controller repository of the plurality of version controller repositories, wherein determining the portion of source code includes receiving user input identifying a section of source code of interest to a programmer.

6. The method of claim 5, further comprising:
determining, by the one or more computer processors, whether an additional programmer has made any changes to the portion of source code of interest to the programmer;
responsive to a determination that the additional programmer has made a change to the portion of source code of interest to the programmer, determining, by the one or more computer processors, respective heat map assignments for each change to the portion of source code based, at least in part, on a type of source code change, a number of changes made, and associated change parameters; and
providing, by the one or more computer processors, respective heat maps for the code related issue clusters and the non-code related issue clusters.

7. The method of claim 1, further comprising:
determining, by the one or more computer processors, a confidence to conflict value and a line of code range for code related issue clusters of the one or more snapshots, wherein the confidence to conflict value represents the probability of the merge conflict;
determining, by the one or more computer processors, a total iteration count divided by a value of a confidence to conflict counter for respective heat map assignments of a particular color; and
determining, by the one or more computer processors, the line of code range for a portion of source code containing the code related issues as indicated by the respective heat map assignments of the particular color.

8. A computer program product comprising:
one or more computer readable storage media and program instructions stored on the one or more computer readable storage media, the stored program instructions comprising:
program instructions to create one or more snapshots for metadata stored in a plurality of version controller repositories, wherein the one or more snapshots correspond to a pre-determined period of time between a start time and an end time;
program instructions to determine a metadata difference between non-code related issue clusters of the one or more snapshots;
program instructions to determine a probability of a merge conflict for code related issue clusters of the one or more snapshots; and
program instructions to output the metadata difference, to a version controller bulletin, the metadata difference and the probability of a merge conflict.

9. The computer program product of claim 8, the stored program instructions further comprising:
program instructions to determine the pre-determined period of time, wherein determining the pre-determined period of time includes receiving user input indicating the start time and the end time.

10. The computer program product of claim 8, wherein the metadata difference between the non-code related issue clusters is determined utilizing a run time query and natural language processing techniques.

11. The computer program product of claim 8, the stored program instructions further comprising:
program instructions to generate a summary of an analysis of the metadata included in the one or more snapshots;
program instructions to determine a polarity weight and subjectivity weight for the generated summary; and
program instructions to output the generated summary, the polarity weight, and the subjectivity weight to the version controller bulletin for display.

12. The computer program product of claim 8, the stored program instructions further comprising:
program instructions to determine a portion of source code stored in a version controller repository of the plurality of version controller repositories, wherein determining the portion of source code includes receiving user input identifying a section of source code of interest to a programmer.

13. The computer program product of claim 12, the stored program instructions further comprising:
program instructions to determine whether an additional programmer has made any changes to the portion of source code of interest to the programmer;
responsive to a determination that the additional programmer has made a change to the section of source code of interest to the programmer, program instructions to determine respective heat map assignments for each change to the portion of source code based, at least in part, on a type of source code change, a number of changes made, and associated change parameters; and
program instructions to provide respective heat maps for the code related issues clusters and the non-code related issue clusters.

14. The computer program product of claim 8, the stored program instructions further comprising:
program instructions to determine a confidence to conflict value and a line of code range for code related issue clusters of the one or more snapshots, wherein the confidence to conflict value represents the probability of the merge conflict;
program instructions to determine a total iteration count divided by a value of a confidence to conflict counter for respective heat map assignments of a particular color; and
program instructions to determine the line of code range for a portion of source code containing the code related issues as indicated by the respective heat map assignments of the particular color.

15. A computer system comprising:
one or more computer processors;
one or more computer readable storage media; and
program instructions stored on at least one of the one or more computer readable storage media for execution by at least one of the one or more computer processors, the stored program instructions comprising:
   program instructions to create one or more snapshots for metadata stored in a plurality of version controller repositories, wherein the one or more snapshots correspond to a pre-determined period of time between a start time and an end time;
   program instructions to determine a metadata difference between non-code related issue clusters of the one or more snapshots;
   program instructions to determine a probability of a merge conflict for code related issue clusters of the one or more snapshots; and
   program instructions to output the metadata difference, to a version controller bulletin, the metadata difference and the probability of a merge conflict.

16. The computer system of claim 15, the stored program instructions further comprising:
   program instructions to determine the pre-determined period of time, wherein determining the pre-determined period of time includes receiving user input indicating the start time and the end time.

17. The computer system of claim 15, the stored program instructions further comprising:
   program instructions to analyze the metadata populated in a version controller repository during the pre-determined period of time in a non-code related issue cluster, wherein analyzing the metadata includes utilizing a run time query and natural language processing techniques to determine the metadata difference between the non-code related issue clusters of the one or more snapshots.

18. The computer system of claim 15, the stored program instructions further comprising:
   program instructions to generate a summary of an analysis of the metadata included in the one or more snapshots;
   program instructions to determine a polarity weight and subjectivity weight for the generated summary; and
   program instructions to output the generated summary, the polarity weight, and the subjectivity weight to the version controller bulletin for display.

19. The computer system of claim 15, the stored program instructions further comprising:
   program instructions to determine a portion of source code stored in a version controller repository of the plurality of version controller repositories, wherein determining the portion of source code includes receiving user input identifying a section of source code of interest to a programmer.

20. The computer system of claim 19, the stored program instructions further comprising:
   program instructions to determine whether an additional programmer has made any changes to the portion of source code of interest to the programmer;
   responsive to a determination that the additional programmer has made a change to the section of source code of interest to the programmer, program instructions to determine respective heat map assignments for each change to the portion of source code based, at least in part, on a type of source code change, a number of changes made, and associated change parameters; and
   program instructions to provide respective heat maps for the code related issues clusters and the non-code related issue clusters.

* * * * *